(12) United States Patent
Luu et al.

(10) Patent No.: US 12,056,456 B2
(45) Date of Patent: Aug. 6, 2024

(54) APPARATUS FOR AUTOMATED SAFETY DATA SHEET PROCESSING

(71) Applicant: Government of the United States as Represented by the Secretary of the Air Force, Rome, NY (US)

(72) Inventors: Jonathan W. Luu, Xenia, OH (US); Kevin P. Fenton, Colorado Springs, CO (US); Steve Simske, Fort Collins, CO (US)

(73) Assignee: United States of America as represented by the Secretary of the Air Force, Rome, NY (US)

( * ) Notice: Subject to any disclaimer, the term of this patent is extended or adjusted under 35 U.S.C. 154(b) by 310 days.

(21) Appl. No.: 17/832,800

(22) Filed: Jun. 6, 2022

(65) Prior Publication Data

US 2024/0135112 A1    Apr. 25, 2024

(51) Int. Cl.
*G06F 40/51*      (2020.01)
*G06F 40/205*     (2020.01)
*G06V 30/19*      (2022.01)
*G06V 30/224*     (2022.01)

(52) U.S. Cl.
CPC ............ *G06F 40/51* (2020.01); *G06F 40/205* (2020.01); *G06V 30/1916* (2022.01); *G06V 30/224* (2022.01)

(58) Field of Classification Search
USPC ......................................... 704/2–5
See application file for complete search history.

(56) References Cited

U.S. PATENT DOCUMENTS

2021/0065256 A1* 3/2021 Shontz ............... G06Q 30/0623
2021/0287164 A1* 9/2021 Keenan, Jr. ........... B66B 1/2408

* cited by examiner

*Primary Examiner* — Leonard Saint-Cyr
(74) *Attorney, Agent, or Firm* — AFRL/RI

(57) ABSTRACT

An apparatus for automated safety data sheet (SDS) processing that translates the entire SDSs from numerous chemical vendors, and in various formats (.pdf, .doc, .txt, .jpg, gif, .png, etc) to machine-encoded text by employing optical, RFID, and infrared scanning, reading and writing devices. The apparatus reads and assess documents as a human would; ensuring that the documents are compliant, ensuring reported values are within expected thresholds, and that there are no conflicts in hazardous material classification, and comparing to similar products for more environmentally friendly alternatives. The apparatus further employs a processor that computes meta-algorithms as trainable neural networks that allow the invention to "learn" and appropriately classify values and calculate statistical probabilities for output accuracy and precision.

16 Claims, 2 Drawing Sheets

APPARATUS FOR AUTOMATED SAFETY DATA SHEET PROCESSING

STATEMENT OF GOVERNMENT INTEREST

The invention described herein may be manufactured and used by or for the Government for governmental purposes without the payment of any royalty thereon.

BACKGROUND OF THE INVENTION

This invention relates generally to the field of hazardous substance safety. More specifically, this invention relates to the identification and safe handling procedures for those hazardous substances found in and utilized in the workplace. More specifically yet, this invention relates to efficient systems and methods designed to automate the voluminous amount of information related to the identification of hazardous substances, their contents, and their safe handling procedures.

Background Environmental, Safety, and Occupational Health (ESOH) program managers employ system safety risk management standard practices to identify, assess, and mitigate environmental, safety, and occupational health risks, and authorize hazardous materials use on U.S. Government installations including USAF installations. The process aims to ensure that the Air Force provides safe and healthful workplaces and conducts operations that minimize risk to mission accomplishment. At the same time, the Air Force preserves resources, protects the environment, and safeguards military and civilian personnel and the public.

However, workplace hazard communication violations are still among the top citations during Environmental, Health, and Safety (EHS) inspections by regulatory agencies. Precise Safety Data Sheet (SDS) selection, fast retrieval of SDSs during emergencies, SDS data management, and material tracking remain areas that can be improved.

Hazardous chemical ingredients are prevalent in many of the products we use day-to-day in both household and industrial applications. The potential hazards and impacts of these chemicals on human health and the environment are primarily communicated to the public through Safety Data Sheets (SDSs) from the chemical vendors or distributors. These documents provide a standardized approach for how and what information is provided to product users to assist them with assessment of precautionary measures, hazard mitigation, emergency response or cleanup procedures, and ESOH management; including many regulatory-driven sections to effectively communicate these hazards to the chemical users.

The U.S. Occupational Health and Safety Administration (OSHA) listed failures in hazard communication as the second highest most frequently cited standard. 3,624 HAZCOM enforcement citations occurred in fiscal year 2019 totaling approximately $4,682,380 in proposed penalties. Each year in the U.S., thousands of workers become sick from workplace chemical exposure with as many as 50,000 people dying each year from adverse effects of long-term chemical exposure. Unfortunately, many current procedures still include maintaining binders of printed SDSs or available copies downloaded on neighboring workstations. These methods are consistently found during inspections to include numerous records that are the incorrect SDS for specific products or are out-of-date, incomplete, illegible, etc.

Implementation of OEH processes and principles is defined to include mandated use of the Defense Occupational and Environmental Health Readiness System-Industrial Hygiene (DOEHRS-IH). This meets the requirement for longitudinal evaluation and documentation of "quantifiable data on personal occupational, environmental, and deployment-related exposures of all service personnel (active duty, reservist, National Guard) throughout their military careers and after leaving military service", in accordance with Presidential Review Directive 5, Improving the Health of Our Military, Veterans, and Their Families and DoDI 6490.03, Deployment Health, which requires the creation and maintenance of an exposure assessment record for each Airman's full career.

Downstream users rely on the data from these SDSs for environmental, safety, and occupational health compliance. PDF remains the predominant format for the millions of SDSs in circulation today. For ESOH systems that require loading of SDS for exposure calculations, environmental reporting calculations, etc., non-ESOH personnel are frequently used to find the correct SDS for the products they are using and often not provided sufficient training to determine whether SDSs are GHS compliant and the proper version for the product. Personnel must typically hand enter information into their respective compliance systems. Each time manual data entry is performed, potential for data quality errors increases, subsequently increasing the potential for compliance liability. These pdfs often also require validation to ensure all regulatory fields have been provided and additional follow up with chemical manufacturers for clarification on data fields or requesting additional information for necessary compliance calculations.

Moreover, prior to the use of any hazardous chemicals in a workplace, common practices typically require some level of authorization and approval for use by the EHS personnel. In order to accurately determine impacts on human health and safety, and the environment, SDSs are typically reviewed to assess hazards and ingredients. These hazard assessments allow the EHS personnel to determine appropriate Personal Protective Equipment, exposure limits, need for engineering controls, potential environmental impacts or regulatory reporting concerns, etc. SDSs are obtained through various ways. For large contracts, a chemical vendor will often provide all contracted material SDSs per contract requirements with the product prior to shipment. For hazardous material procured through local economic methods, online services, etc., the industrial personnel are sometimes required to provide the SDS for the products they will use to the EHS team for analysis. If no comparison is done between the SDS and product by the EHS team, potential liability has already emerged by SDS selection by minimally or untrained non-EHS personnel. Mistakes are common and easy to make if a person isn't validating the proper trade names and product codes and ensuring that the revision date is the applicable version for that SDS. Formulations often change over time and the selection of an SDS seven years old may have considerably different chemical formulations leading to significant compliance concerns with incorrect EHS assessments and other potential liabilities such as mischaracterization of waste.

Direct vendor communication of SDSs using XML or equivalent transfer methods is needed to eliminate the need for separate manual data entry and current outdated communication methods.

OBJECTS AND SUMMARY OF THE INVENTION

Before an essential product is introduced into a process, precise SDS selection for products used in the workplace is of vital importance for EHS assessments. The hazards communicated and the ingredients listed form the basis of occupational health and safety assessments, calculations for environmental reporting, and how emergency response staff addresses and responds to spills and accidents.

For EHS systems that require loading of SDS for exposure calculations, environmental reporting calculations, etc., non-EHS personnel are frequently used to find the correct SDS for the products they are using and often not provided sufficient training to determine whether SDSs are GHS compliant and the proper version for the product.

In order to retrieve SDSs for chemical products used in the workplace, chemical users are largely responsible for finding the appropriate SDS that corresponds with each product used. SDSs are commonly housed on manufacturer websites and differ from site to site and further confusion can be introduced as distributors can sometimes create their own SDSs, making product matches difficult. This often leads to the lack of immediate access of SDS to personnel in a workplace.

Additionally, Portable Document Format (pdf) remains the predominant format for the millions of SDSs in circulation today. These pdfs often also require validation to ensure all regulatory fields have been provided and additional follow up with chemical manufacturers for clarification on data fields or requesting additional information for necessary compliance calculations. Direct vendor communication of SDSs using XML or equivalent transfer methods is needed to eliminate the need for separate manual data entry and current outdated communication methods.

Among U.S. Government agencies the USAF, for example, receives, reviews, and transcribes product hazard data (PHD) from approximately 2,500-4000 Safety Data Sheets (SDS) monthly through the Hazardous Material Management Process (HMMP) team consisting of representatives from Environmental, Safety, and Occupational Health. The SDS and PHD is assessed for its use throughout the lifecycle of the product from cradle to grave. The product's data is manually reviewed, hand entered and assigned to their respective compliance systems. This manual process introduces unstandardized interpretation of hazards, relying on individual judgement, which creates inefficiencies to cost, data quality, and timeliness to meet the readiness mission.

Additionally, other downstream users rely on the data from these environmental, safety, and occupational health compliance systems and if not properly integrated, must also hand enter this information into their respective systems. Each time manual data entry is performed, potential for data quality errors increases, subsequently increasing the potential for compliance liability.

The USAF, the Department of Defense (DoD), and industrial chemical institutions, are required to meet the demands of Federal Laws and Regulations, Presidential and Congressional inquiries, as well as Environmental, Safety, and Occupational Health (ESOH) needs.

The current process for collecting, analyzing, and assessing SDS PHD data is ineffective and inefficient. The motivation for the present invention, therefore, is the reduction and/or elimination of the manual efforts associated with reading, analyzing, translating, and validating SDS data by leveraging current technologies to convert SDSs into machine-encoded text for database use. Data stewarding efforts for the loading of SDSs are currently paid for by the Air Force, Defense Logistics Agency, and other services for occupational health, safety, and environmental tracking and reporting needs. For the DoD as a whole, this invention is expected to save over $3 million annually. While this invention can significantly reduce costs and increase operational efficiency for the DoD, this invention will also have implications in the civilian sector as it could reduce their data entry costs as well and help move the entire industry to an electronic standard.

It is therefore an object of the present invention to provide an apparatus that automates the process for identifying, ensuring safe handling and storage, and tracking hazardous materials in accordance with Safety Data Sheet (SDS) requirements.

It is a further object of the present invention to provide an apparatus that automatically retrieves and interprets SDS information in text, image, radio frequency, and infrared format.

It is still a further object of the present invention to provide an apparatus that refines, validates and ensures the accuracy of retrieved SDS data through the use of meta-algorithmic based trainable neural networks.

It is yet still a further object of the present invention to provide an apparatus that stores and retrieves validated SDS data in universal SDS repositories.

Briefly stated, the present invention achieves these and other objects by translating entire SDSs from numerous chemical vendors, and in various formats (.pdf, .doc, .txt, .jpg, .gif, png, etc) to machine-encoded text by employing optical, RFID, and infrared scanning, reading, and writing devices. The invention reads and assess documents as a human would; ensuring that the documents are compliant, ensuring reported values are within expected thresholds, and that there are no conflicts in hazardous material classification, and comparing to similar products for more environmentally friendly alternatives. The invention further employs a processor that computes meta-algorithms as trainable neural networks that allow the invention to "learn" and appropriately classify values and calculate statistical probabilities for output accuracy and precision.

According to an embodiment of the present invention, an apparatus for automated processing of hazardous material safety data, comprises an optical character recognition device for translating hazardous material safety data sheet information in text form to digital data; an image recognition device for translating hazardous material safety data sheet pictograms into digital data; a device for extracting from or writing to as digital data hazardous material safety data sheet information from or to hazardous material labels including radio frequency identification (RFID) labels, QR Code labels, and infrared labels. The apparatus also includes a processor device that, when executing computer-implementable instructions, performs the steps to classify said digital data; calculate statistical probabilities for the accuracy and precision of said digital data through meta-algorithmic computations providing comparison and validation; refine said classification of said digital data to ensure a confidence level is attained; validate said digital data through queries against a Globally Harmonized System and Host SDS repository schema; create a machine-encoded text file from said validated digital data; and upload said machine-encoded text file to a hazardous material safety data repository.

The above and other objects, features and advantages of the present invention will become apparent from the following description read in conjunction with the accompanying drawings, in which like reference numerals designate the same elements.

DETAILED DESCRIPTION OF THE PREFERRED EMBODIMENT

Figure 1:
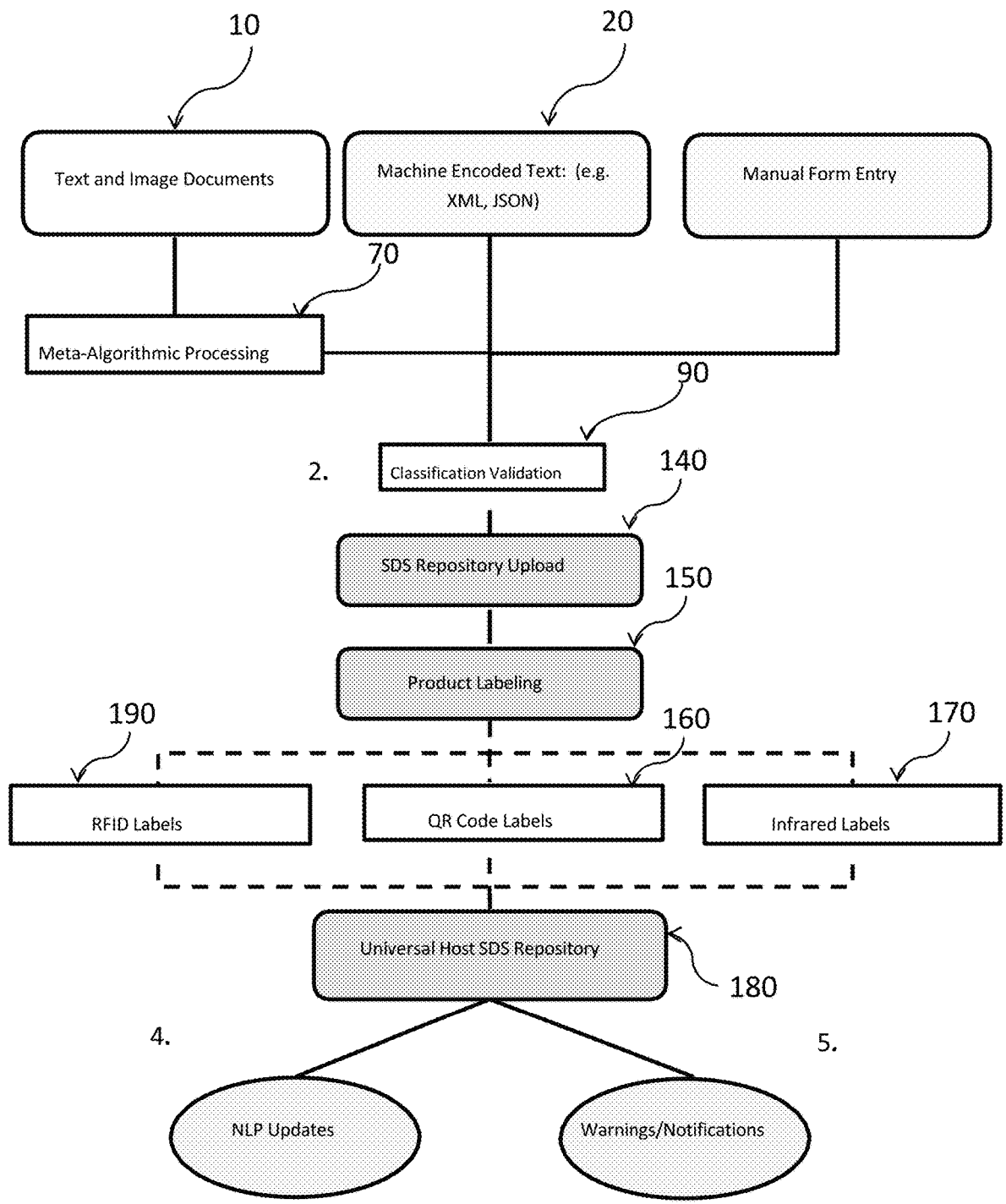
FIG. 1 is a flowchart depiction of the end-to-end operation of the present invention for the extraction of Safety Data Sheet (SDS) information through machine text, optical scanning and character recognition, radio frequency (RFID) and infrared scanning means, and upload to SDS repositories.

Referring to FIG. 1, the invention presented here serves two main functions. First, the invention translates the entire SDSs from numerous chemical vendors, and in various formats (.pdf, .doc, .txt, .jpg, gif, .png, etc), each with distinct formatting (linebreaks, paragraphing, spacing, logos, headers, etc.) 10, to machine-encoded text 20 with a high degree of accuracy and precision. The invention then "reads" and assess documents as a human would; ensuring that the documents are compliant, ensuring reported values are within expected thresholds (FIG. 2, 130), and that there are no conflicts in hazardous material classification, and comparing to similar products for more environmentally friendly alternatives.

Figure 2:
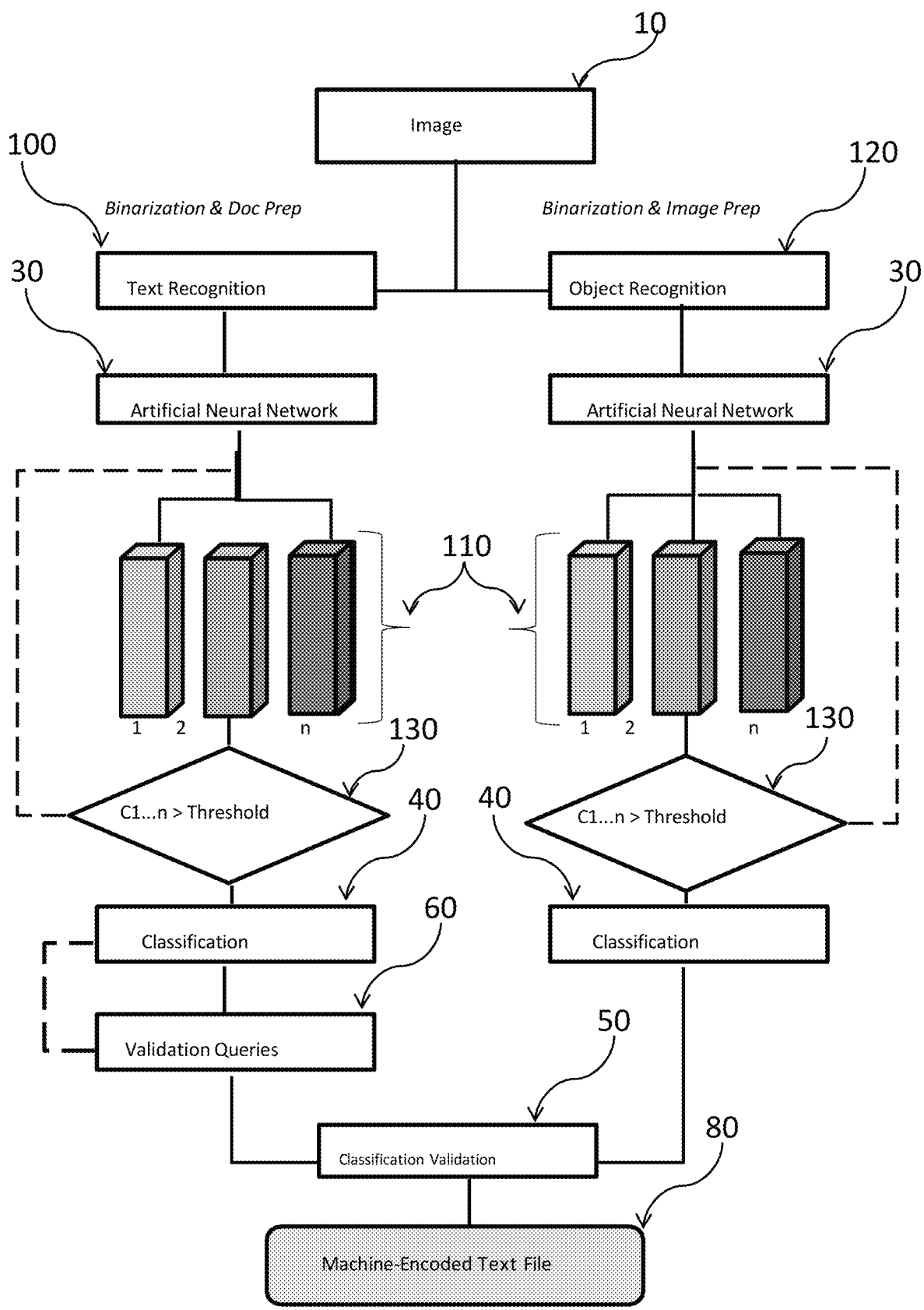
FIG. 2 is a flowchart depiction of the meta-algorithmic based neural network process for classification and validation of extracted Safety Data Sheet (SDS) information.

Referring to FIG. 2, the invention's trained neural networks 30 provide a base to allow the invention to "learn" and appropriately classify 40 values and calculate statistical probabilities for output accuracy and precision. Meta-algorithmic processing (see FIG. 1, 70) though algorithms, functions of these algorithms, and combinations thereof are employed to refine classification 40 until the appropriate level of confidence has been reached or no higher confidence can be reached within the capabilities of the approaches taken. Once classified, parsed text segments are scrubbed to remove outlier characters and are validated 50 (see also FIG. 1, 90) through queries 60 against a Globally Harmonized System (GHS) schema to ensure numerical values are within expected thresholds 130, mandatory components have been identified, and desired calculations are achievable given the provided data. A machine-encoded file 80 (see also FIG. 1, 20) is then produced from the data.

Optical Character Recognition and Neural Networks

For the millions of SDSs that still reside in pdf form, one obstacle of many EHS systems is the need to manually enter chemical information from SDSs into their respective systems for reporting calculations and tracking needs. Still referring to FIG. 2, the present invention's use of Optical Character Recognition (OCR) 100 allows for these documents to be broken down to machine-encoded text 80 (see also FIG. 1, 20) using a variety of prominent OCR tools (e.g. Adobe Pro, Abbey, and Google Tesseract). One difficulty with SDS documents is the vast differences in format from manufacturer to manufacturer. Although GHS and REACH regulations have provided some structure in required sections, how and where the data is relayed to readers varies widely. Artificial Neural Networks 30 allow the present invention to take OCR 100 another step further and use machine learning applications to provide structure to unstructured data sets and essentially learn to "read" an SDS and parse desired fields as required. The benefits of incorporating this technology in the invention can yield significant time and monetary savings for organizations that require data entry teams to manually load thousands of these documents each year. It is within the scope of the present invention to have additional configurations with additional algorithms 1, 2, . . . n 110 added for alternate data extraction and validation uses. As regulatory needs change, the invention could easily be adapted to new text identification and classification, regulatory validation needs, and calculations. Additionally, if SDS or other relevant hazard or chemical information become available on product barcodes or other labeling, the invention can be expanded to receive incoming barcode/label submissions as well as generate outgoing barcodes/labels 120. The invention can also be expanded to accept xml or equivalent files and store together with OCR-derived SDSs. Also, the invention can be tailored for additional environmental compliance documents such as chemical product technical or specification documents, hazardous waste manifests, etc. as these documents become available. Finally, the invention can incorporate Natural Language Processing (NLP) to receive updates from applicable web sites (e.g. chemical vendors, regulatory agencies, reputable news sources) of articles/publications involving the specified product/chemical.

OCR Language Translation Services

If the SDS is in a foreign language or parts of the SDS are in a foreign language, the present invention translates the SDSs into the desired host language. Using parallel processing paths depicted in FIG. 2, the invention then performs Optical Character Recognition (OCR) 100 on the documents and image recognition 120 on contained images. Artificial neural networks 30 are then used to identify patterns and levels of confidence of document attribute classifications. Additionally, multiple algorithms 110 including machine learning key-value pattern arrays, syntax learning, and tessellation and recombination compare 130 against neural network identified attributes and improve confidence in classification 40.

SDS Pictogram Image Recognition, Classification, and Validation

Similar to the use of neural networks for SDS text parsing and classification, neural networks are also used by the present invention for image recognition of GHS and other regulatory pictograms on an SDS. For images 10, neural networks 30 and normalized cross-correlation is used to classify images. Once text has been classified to the greatest extent of confidence, validation queries 60 are used to validate numerical fields, calculate Hazard Characteristic Codes (HCC), validate completeness of the documents, and validate classifications 50 against pictogram images 10 contained in the document. For instance, an ANN performs recognition on a GHS pictogram and classifies 40 it as a corrosive pictogram. Validation 50 occurs through the text recognition of the pH and determine whether the pH value accurately supports this classification. Lastly, the present invention encrypts 80 the document file to ensure alterations do not occur in data transfer. This is used to ensure proper labelling and validation of the SDS itself.

Although serving as the enabling technology of the present invention, the utility of the present invention extends beyond Safety Data Sheet (SDS) recognition and interpretation. Referring to FIG. 1, the output encrypted document file (FIG. 2, 80) once classified and validated 90 (see also FIG. 2, 50) is uploaded into an SDS repository 140. The invention thereafter employs several labeling technologies to incorporate SDS information on the products themselves. Specifically, precise SDS selection and information availability to a user can be realized by the present invention by moving from traditional legacy product barcodes to several modern applications than can be used to quickly direct users to the product's SDS. The present invention utilizes several of these modern applications in conjunction with product labeling 150.

In the advent of the COVID-19 global pandemic, the use of QR codes has seen a dramatic rise with many restaurants replacing hard copy menus with digitally-accessible versions online through the use of common cell phone camera applications. The present invention utilizes QR code labels 160 which are available in two forms—static and dynamic, dependent on whether a user wants data essentially hard-coded into a barcode or through the use of a URL that can be modified after printing. Numerous QR code generators exist for chemical vendors or EHS personnel to create these codes at little to no additional cost. A simple mobile application could be used to transmit an embedded SDS directly to the present invention's universal host SDS repository 180.

Chemical product labelling can be difficult, however, regardless of size products still must provide sufficient hazard, use, and ingredient information and other relevant product information. Product real estate can be sparse and not offer manufactures room for other desirable information such as SDS links or direct SDS information. The present invention reads IR-transparent barcodes 170 and can transmit the informational contents therein to the invention's universal host SDS repository 180. This feature offers an additional barcoding and/or labeling solution by allowing vendors to provide this additional information without compromising on required or other valuable information.

Hazardous material and hazardous waste management typically requires a database for large operations to accurately and consistently monitor where containers are and closely observe the amount of time containers exist at these sites and approach regulatory thresholds. The present invention's use of RFID technology can be used to eliminate the need to track hazardous material containers from supply points to end users or waste containers as they move from satellite accumulation points (SAP) to centrally managed hazardous waste storage areas (HWAS) or treatment, storage, and disposal facilities (TSDFs). The invention's RFID tags or labels 190 eliminate the need for line of sight between tags and readers allowing expedited inventory management and accountability. Microchips in RFID tags can be either read-only or read-write. The latter feature allows users of the present invention to add data to the RFID tag 190 such as the waste profile number for the waste, the accumulation start date and the site-specific regulatory start date. Likewise, for hazardous materials, SDS IDs, expiration dates, etc. could be loaded against the RFID tag 190. The benefits of this feature of the invention yields significant time savings of personnel, monetary savings of reduced data entry and tracking, and increased EHS accountability of hazardous material containers. RFID tag information is likewise uploadable to the present invention's universal host SDS repository 180.

Still referring to FIG. 1, although some repositories such as SDS.com exist, these are not all inclusive and can require membership payments. Chemical users should be entitled a single centralized universal repository for all SDS with easy and intuitive access. For an effective Universal Safety Data Sheet system, the present invention accommodates the many possible ways SDSs can be received and how these varying SDS submittals methods can be consolidated into a single management approach. In a preferred embodiment, SDSs are transmitted via a user interface directly to the invention's universal host SDS repository 180 in a standardized xml or equivalent data transfer form.

The present invention's user interface to the universal host SDS repository 180 provides an additional benefit for new SDS creation whereby smaller chemical vendors can create GHS-compliant SDSs directly in the system. Likewise, even within the DoD, lab research is performed where new chemicals and products are created requiring the creation of a corresponding SDS. This feature of the invention would accommodate these situations and allow for the SDS data to be stored in the universal host SDS repository 180 via same user interface feature as are the standardized xml and OCR-neural network processed submittals. Additionally, this user interface feature of the present invention allows other systems using SDSs to communicate the information directly to the universal host SDS repository 180 via following the same XML or equivalent data standard. Also, user interface feature can be further optimized with hazardous material manufacturer's support via embedding of SDS links within the product barcodes to allow instant SDS access utilizing QR code readers found on any modern smart phone. In the event of an emergency, rather than logging on to a computer or looking through binders for the appropriate SDS, the specific SDS associated with a hazardous material accident can be produced instantly with ubiquitous handheld smartphone technology.

What is claimed is:

1. An apparatus for automated processing of hazardous material safety data, comprising:
   an optical character recognition device for translating hazardous material safety data sheet information to digital data;
   an image recognition device for translating hazardous material safety data sheet pictograms into digital data;
   a device for extracting as digital data hazardous material safety data sheet information from any one of the group of hazardous material label types consisting of: radio frequency identification (RFID) labels, QR Code labels, and infrared labels;
   a device for creating as digital data hazardous material label information compatible any one of the group of hazardous material label types consisting of: radio frequency identification (RFID) labels, QR Code labels, and infrared labels; and
   a processor device that, when executing computer-implementable instructions, performs the steps to:
   classify said digital data;
   calculate statistical probabilities for the accuracy and precision of said digital data through meta-algorithmic computations providing comparison and validation;
   refine said classification of said digital data to ensure a predetermined confidence level is attained;
   validate said digital data through queries against a Globally Harmonized System and Host SDS repository schema;
   create a machine-encoded text file from said validated digital data; and
   upload said machine-encoded text file to a hazardous material safety data repository.

2. The apparatus of claim 1, wherein said computer-implementable instructions further cause said processor device to perform the steps to perform said meta-algorithmic computations of one or more individual algorithmic methods on said digital data so as to increase the accuracy of said apparatus by building on said one or more individual algorithmic methods.

3. The apparatus of claim 2 wherein any one of said one or more individual algorithmic methods is selected from the group of individual algorithmic methods consisting of:
   a conventional neural network parsed text field algorithm;
   a key-value pattern array parsed text algorithm;

a parsed text derived from natural language syntax and segmentation algorithm;

a tessellation and recombination algorithm; and a language translation algorithm.

4. The apparatus of claim 3, wherein one or more artificial neural networks are formed from one or more of said meta-algorithmic computations.

5. The apparatus of claim 4, wherein said one or more artificial neural networks comprises functions of one or more of said meta-algorithms.

6. The apparatus of claim 1, wherein said step of providing validation comprises ensuring that:

numerical values are within expected thresholds;

mandatory components have been identified; and desired calculations are achievable for said digital data.

7. The apparatus of claim 1, wherein said machine-encoded text file is encrypted prior to said step of uploading to said hazardous material safety data repository.

8. The apparatus of claim 1, wherein said step of extracting said digital data from QR code labels comprises extracting SDS data directly embedded in said QR code label utilizing said device for extracting as digital data hazardous material safety data sheet information.

9. The apparatus of claim 8, wherein said device for extracting as digital data hazardous material safety data sheet information is a smartphone QR code reader.

10. The apparatus of claim 1, wherein said step of extracting said digital data from QR code labels comprises extracting SDS data indirectly from a URL embedded in said QR code label utilizing said device for extracting as digital data hazardous material safety data sheet information.

11. The apparatus of claim 10, wherein said device for extracting as digital data hazardous material safety data sheet information is a smartphone QR code reader.

12. The apparatus of claim 1, wherein said device for creating hazardous material label types further comprises adding to said RFID label, by RFID means, any one of the descriptors selected from the group consisting of:

waste profile number for hazardous waste;

accumulation start date for hazardous waste;

site-specific regulatory start date for hazardous waste;

SDS identification number for hazardous materials; and expiration date for hazardous materials;

storage temperatures;

SDS links;

Hazard Characteristic Codes; and container numbers.

13. The apparatus of claim 1, wherein said processor device that, when executing said computer-implementable instructions, performs the steps to calculate a Hazard Characteristic Code (HCC) from SDS data, wherein said Hazard Characteristic Code (HCC) provides labeling and storage incompatibility monitoring.

14. The apparatus of claim 13, wherein said infrared-transparent barcodes comprise reflective technology.

15. The apparatus of claim 13, wherein said infrared-transparent barcodes comprise fluorescent technology.

16. The apparatus of claim 1, wherein said infrared labels comprise infrared-transparent barcodes.

* * * * *